UNITED STATES PATENT OFFICE.

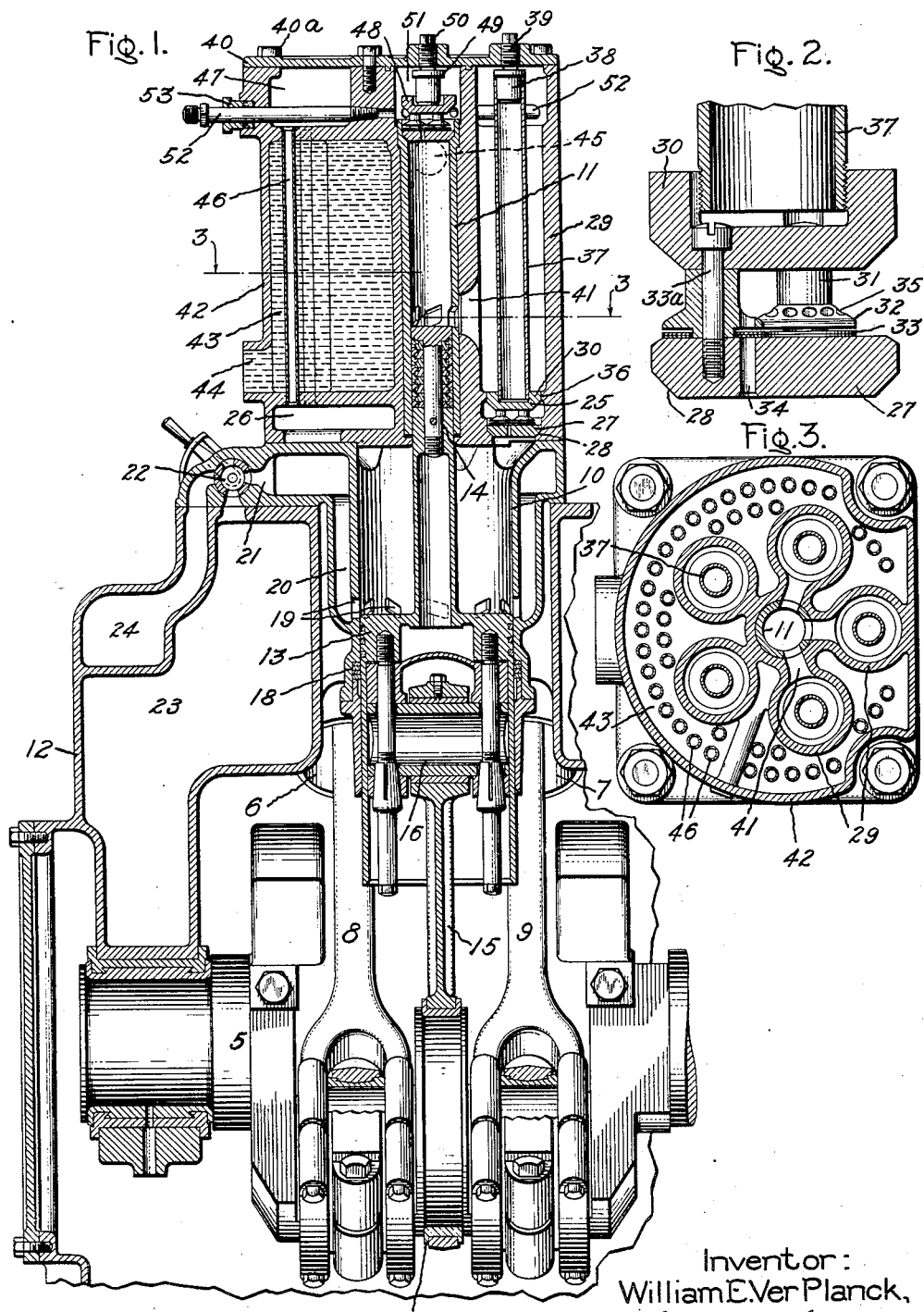

WILLIAM EVERETT VER PLANCK, OF ERIE, PENNSYLVANIA, ASSIGNOR TO GENERAL ELECTRIC COMPANY, A CORPORATION OF NEW YORK.

AIR-COMPRESSOR.

1,245,643.  Specification of Letters Patent.  Patented Nov. 6, 1917.

Application filed August 2, 1916. Serial No. 112,844.

*To all whom it may concern:*

Be it known that I, WILLIAM EVERETT VER PLANCK, a citizen of the United States, residing at Erie, in the county of Erie, State of Pennsylvania, have invented certain new and useful Improvements in Air-Compressors, of which the following is a specification.

The present invention relates to reciprocating air compressors, such, for example, as are particularly intended to be operated directly from the crank shaft of an internal combustion engine and used to provide blast air for blowing fuel into the cylinder or cylinders of the engine, and also to furnish starting air for the engine.

One object of the invention is to provide an improved structure in a compressor of this type which will be compact and in which all the parts, and particularly the discharge valves, will be readily accessible without disturbing any of the piping connections.

A further object of the invention is to provide a structure in which no suction valves are used and in which the discharge valves may be so distributed that very close clearances may be used.

For a consideration of what I believe to be novel and my invention, attention is directed to the accompanying specification and the claims appended thereto.

In the accompanying drawing, Figure 1 is a vertical section through a compressor embodying my invention; Fig. 2 is a detail sectional view through a delivery valve mechanism; and Fig. 3 is a section taken on line 3—3, Fig. 1, looking in the direction of the arrows.

Referring to the drawing, 5 indicates the crank shaft of a multi-cylinder internal combustion engine, 6 and 7 the lower ends of two of the cylinders thereof, and 8 and 9 connecting rods for the two pistons which move in cylinders 6 and 7. It will be understood that my invention may be used in connection with any suitable type of engine, or that it may be utilized in other connections. In the present instance, it is shown in connection with an engine as disclosed in my application, Serial No. 112,845, filed of even date herewith, wherein the cylinders are arranged on opposite sides of the crank shaft in V-shaped relation to each other, the compressor being arranged between them and vertically over the crank shaft. The compressor illustrated comprises two stages. 10 indicates the cylinder of the first or lower pressure stage and 11 the cylinder of the second or high pressure stage, the cylinders being arranged in vertical alinement and suitably supported on the engine frame or base 12. 13 indicates the piston of the low pressure stage, formed integral with the head of which is the piston 14 of the high pressure stage. The pistons are of the trunk type and are both operated from a connecting rod 15, one end of which is suitably connected to the piston 13 by a wrist pin 16, and the other end of which is connected to a bearing 17 on the crank shaft, which bearing is located between the bearings for adjacent connecting rods 8 and 9. In the present instance the detail structure of the connection between the rod 15 and piston 13 is the same as that described and claimed in my application Serial No. 112,842, filed of even date herewith. The lower end of piston 13 is lubricated by splash lubrication, as is common in connection with internal combustion engines, and located in the wall of cylinder 10 are oil scraper rings 18 to scrape back the lubricant and prevent an unduly large amount working up past the piston head. Air is supplied to the low pressure cylinder 10 through ports 19 spaced around the cylinder wall, which ports connect with an annular chamber 20 surrounding it and to which air is supplied through a passage 21, which, by means of a valve 22, may be connected in the present instance with the scavenging air receiver 23 of the engine, or with a chamber 24 which may connect with the atmosphere. When connected with the scavenging air receiver it means that the air is supplied to the first stage under an initial pressure somewhat above atmospheric, for example, 5 to 8 lbs. The valve 22 may also be used to throttle the suction of the compressor to control the same. Air from the low pressure stage is discharged from the cylinder 10 through a series of discharge valves 25 to an annular discharge chamber 26. A number of these discharge valves (in the present instance 5) are provided equally spaced around the cylinder 10. They are preferably of the disk type, and each comprises a lower member 27 having a valve seat 28 which fits a seat in the bottom of a tube 29, and an upper member 30 spaced from the member 27 by a plurality of valve guides 31 having flanges 32 thereon which form stops for the disks 33, all the parts being fastened together by bolts 33ª which pass through the centers of the valve guides. The lower member 27 is provided with a series of holes 34 for the passage of air and the stops 32 are provided with holes 35, the purpose of which is to keep the disks 33 from sticking on them, as is well known. There are preferably two disks 33, one on top of the other, and they have suitably spaced holes through which the guides 31 pass. The upper member 30 makes a close fit with an annular flange 36 inside tube 29, which flange acts as a guide for the valve and also prevents the leakage of air, and it is provided with a threaded recess in its top into which threads the lower end of a rod 37. In the present instance the rod is shown in the form of a pipe, the upper end of which is closed by a plug 38 against which screws a bolt 39 in the cover plate 40 which is held in place by bolts 40ª. By screwing the bolts 39 down, the valves can be very firmly seated and held in place. The pipes 37 are also used in inserting and removing the valves. There are as many tubes 29 as there are valves, and each tube communicates with the cylinder 11 of the high pressure piston through an admission port 41. Surrounding the cylinder 11 is a wall 42 forming an annular cooling chamber 43 to which water or other cooling medium is admitted by a pipe 44 located adjacent the lower end of the chamber, and from which it is discharged by one or more pipes 45 located adjacent the upper end thereof. Extending across the chamber 43 are a number of pipes 46 which connect the annular discharge chamber 26 to a chamber 47 which is in communication with the upper ends of the tubes 29. The pipes 46 convey the air discharged from the low pressure stage into chamber 26 up to chamber 47, from which it passes down through tubes 29 into the high pressure cylinder 11 when the ports 41 are uncovered by the piston 14. 48 indicates the discharge valve for the high pressure or second stage of the pump. It is of the same general structure as the discharge valves for the low pressure stage, and is held on a seat in the end of cylinder 11 by a spacing member 49 and a bolt 50. Air from cylinder 11 is discharged through discharge valve 48 into a chamber 51 from which it may be conveyed by a number of pipes 52 directly to the point or points of consumption, as for example the fuel injectors of an engine. Or if desired it may be conveyed to suitable storage reservoir. 53 are suitable packing boxes for pipes 52.

In operation, when the pistons 13 and 14 are at the outer ends of their strokes, and the ports 19 and 41 are uncovered, the cylinders 10 and 11 are filled with air from the chamber 20 surrounding cylinder 10 and from the tubes 29. On the compression stroke the air in each cylinder is compressed and forced past the discharge valves 25 and 48, the air from the first stage passing to chamber 26 up through pipes 46 to chamber 47 and tubes 29, and the air from the second stage passing to chamber 51 and thence out by tubes 52. The air in passing through pipes 46 is cooled by the fluid surrounding them. This fluid also serves to cool the cylinder 11 and piston 14 of the second stage of the compressor.

In the above described arrangement it will be noted that no suction valves are utilized. This enables the discharge valves for the low pressure cylinder to be distributed entirely around its head so that ample discharge area is provided; and at the same time the valves are located directly in the cylinder head so that a very close clearance is obtained. Likewise in the case of the high pressure cylinder, the discharge valve may form the entire head of it which again permits of a close clearance being utilized in this stage also.

To remove the discharge valves of both the high pressure and low pressure cylinders it is only necessary to remove the cover plate 40 which renders them readily accessible. And they may be removed without in any way disturbing any of the air piping connections or the cooling water connections.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In a multi-stage compressor, the combination of a low pressure cylinder, a higher pressure cylinder alined therewith, pistons for the cylinders, a cooling chamber surrounding the higher pressure cylinder, tubes extending across said chamber and spaced around the higher pressure cylinder, discharge valves for the low pressure cylinder located in said tubes, cooling pipes which extend across the said cooling chamber and connect the discharge side of said discharge valves to said tubes above the said valves, means connecting said tubes to the higher pressure cylinder, and a discharge valve for the higher pressure cylinder.

2. In a multi-stage compressor the combination of a low pressure cylinder, a high pressure cylinder axially alined therewith, pistons for said cylinders, a cooling chamber surrounding the high pressure cylinder, tubes extending across said chamber and spaced around the high pressure cylinder, discharge valves for the low pressure cylinder located in one end of said tubes, cooling pipes extending across the cooling chamber and connecting the discharge side of said valves to the other end of said tubes, ports connecting said tubes to the high pressure cylinder said ports being controlled by the piston in such cylinder, and a discharge valve for the high pressure cylinder.

3. In a multi-stage compressor, the combination of a low pressure cylinder, a high pressure cylinder axially alined therewith, admission ports in the walls of the cylinders, pistons for the cylinders which cover and uncover said ports, a cooling chamber surrounding the high pressure cylinder, tubes which extend across it and are spaced around the high pressure cylinder, discharge valves in one end of said tubes, a discharge chamber with which the discharge sides of said valves communicate, pipes which extend across the cooling chamber and connect said discharge chamber to the other end of said tubes, ports which connect said tubes to the admission ports in the high pressure cylinder, a discharge valve located in the end of the high pressure cylinder, a discharge chamber with which the discharge side of said valve communicates, and a cover plate which forms a wall of the last named discharge chamber and also covers the ends of said tubes.

4. In a multi-stage compressor, the combination of a low pressure cylinder, a high pressure cylinder axially alined therewith, admission ports in the walls of the cylinders, pistons for the cylinders which control said ports, a series of discharge valves for the low pressure cylinder which are located in the head of said cylinder and are spaced around the high pressure cylinder, a discharge chamber with which the discharge sides of said valves communicate, means forming conduits connecting said discharge chamber to the admission ports of the high pressure cylinder, and a single discharge valve for the high pressure cylinder located in the outer end thereof.

5. The combination with an internal combustion engine having a crank shaft, of a two stage compressor operated from a crank on the shaft, said compressor comprising a low pressure cylinder, a wall surrounding it and forming a supply chamber, said cylinder having ports in its wall which communicate with the supply chamber, a high pressure cylinder also having ports in its wall, pistons for the cylinders which control said ports, a cooling chamber for the high pressure cylinder, discharge valves for the low pressure cylinder, pipes which extend across the cooling chamber and connect the discharge side of said valves to the admission ports of the high pressure cylinder, and a discharge valve for the high pressure cylinder.

6. In a compressor, the combination of a low pressure cylinder, a high pressure cylinder, a series of discharge valves for the low pressure cylinder, tubes which extend parallel with the high pressure cylinder and in which said valves are located, rods extending through said tubes and connected to said valves for inserting and removing them, a discharge valve in the end of the high pressure cylinder, a cover plate, and means carried by the cover plate which engage the ends of said rods and said high pressure valve for holding the valves firmly seated.

In witness whereof, I have hereunto set my hand this 31st day of July 1916.

WILLIAM EVERETT VER PLANCK.